Jan. 21, 1947.    A. H. BEDWORTH ET AL    2,414,434
BOTTLE CAPPING MACHINE
Filed May 31, 1941    7 Sheets-Sheet 5

Inventors
Lewis G. Curtis
Arthur H. Bedworth
by Roberts, Cushman & Woodbury
Att'ys.

Jan. 21, 1947.   A. H. BEDWORTH ET AL   2,414,434
BOTTLE CAPPING MACHINE
Filed May 31, 1941   7 Sheets-Sheet 6
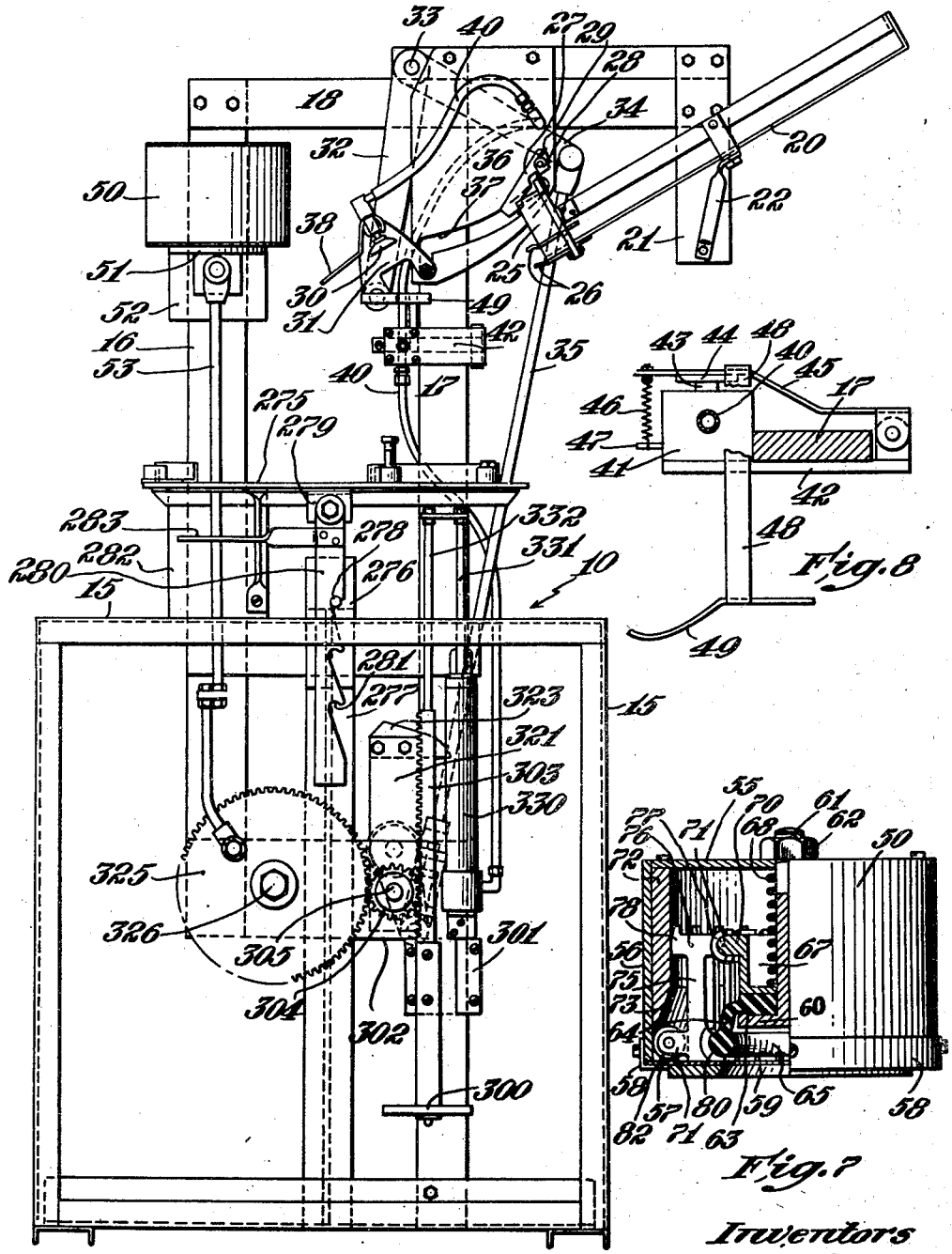
Inventors
Lewis G. Curtis
Arthur H. Bedworth
by Roberts, Cushman & Woodbury
attys.

Jan. 21, 1947.  A. H. BEDWORTH ET AL  2,414,434
BOTTLE CAPPING MACHINE
Filed May 31, 1941  7 Sheets-Sheet 7

Inventors
Lewis G. Curtis
Arthur H. Bedworth
by Roberts, Cushman & Woodbury
Att'ys.

Patented Jan. 21, 1947

2,414,434

UNITED STATES PATENT OFFICE 2,414,434

BOTTLE CAPPING MACHINE

Arthur H. Bedworth and Lewis G. Curtis, Medford, Mass.; said Bedworth assignor to said Curtis Application May 31, 1941, Serial No. 395,958

11 Claims. (Cl. 226—85)

This invention relates to an improvement in bottle capping machines, more particularly of the type wherein two stations are provided for the bottle to be capped; at the first station a cap, having a downwardly projecting flange, fed into the path of a bottle is removed from the feeding mechanism and placed on the mouth by the movement of the bottle, and at the second station the bottle thus capped is sealed by crimping or clamping the flange of the cap against the outer wall of the bottle.

The present invention will be described as embodied in a machine for capping milk bottles, which is of the type adapted for small dairies, in which the bottles are manually fed to and removed from the machine. It will be understood, however, that the invention is not so limited and that the essential features to be pointed out and described herein may be employed in large machines where the bottles are fed automatically.

The illustrated machine is adapted to cap a bottle having an annular bead surrounding the mouth with a cap of tinfoil, Celluloid or the like, having a narrow flange which is crimped against the under side of the bead.

The objects of this invention are to provide a simple, easily operated machine in which the advance of the bottle sets the cap feeding and cap sealing mechanisms into operation; which can be readily adjusted for bottles of various sizes, e. g., quarts, pints and half-pints; in which the mechanism is operated only when a bottle is to be capped; and which embodies other novel features, all as will be herein set forth and claimed.

In the drawings:

Fig. 7 is a view of the cap sealing head with portions broken away;

Fig. 8 is a plan view illustrating a control feature of the cap feeding unit;

Fig. 9 is a view similar to Fig. 1 of another machine embodying this invention;

Figure 1:
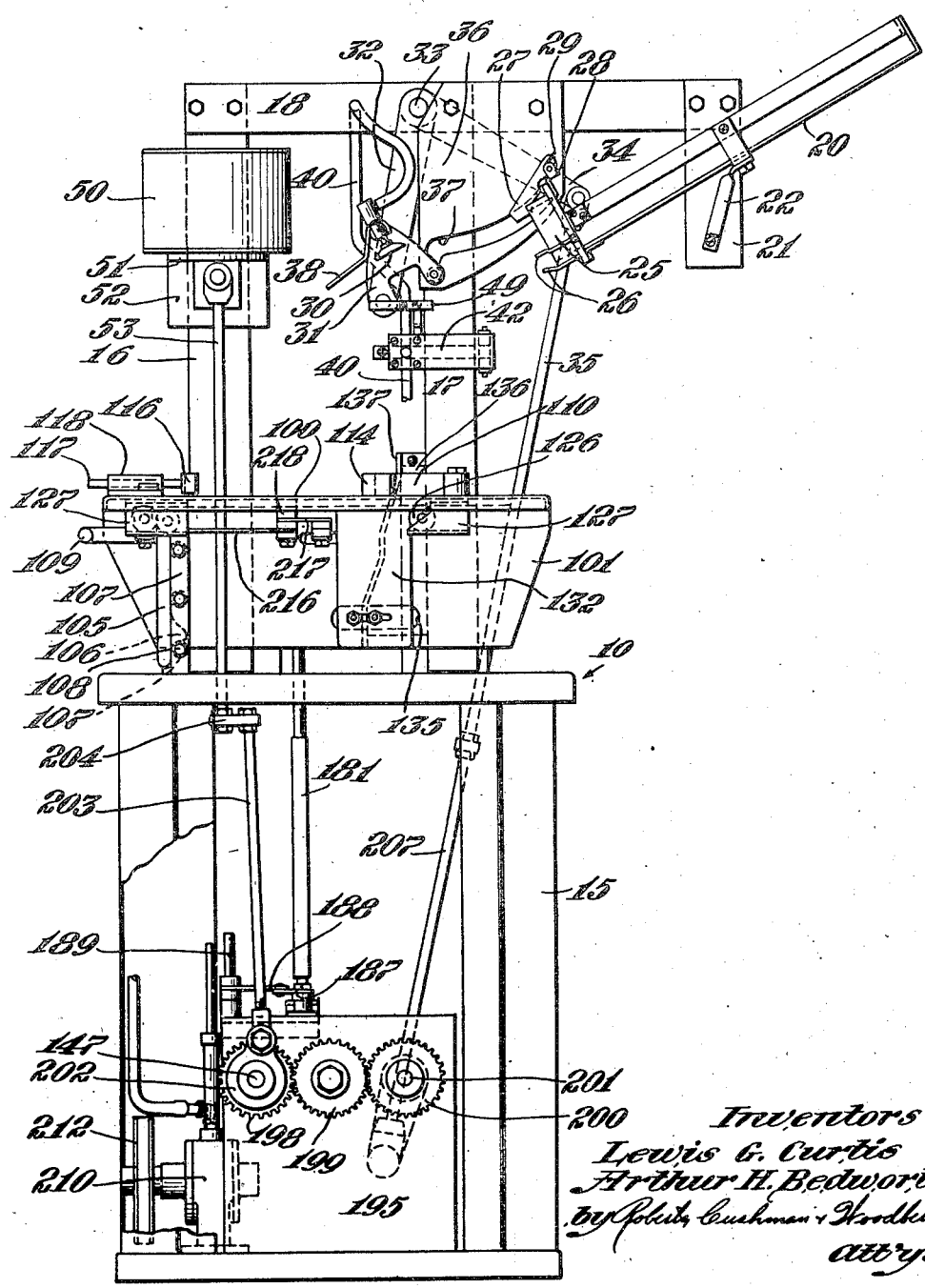
Figure 1 illustrates in side elevation a machine embodying this invention.
Figure 2:
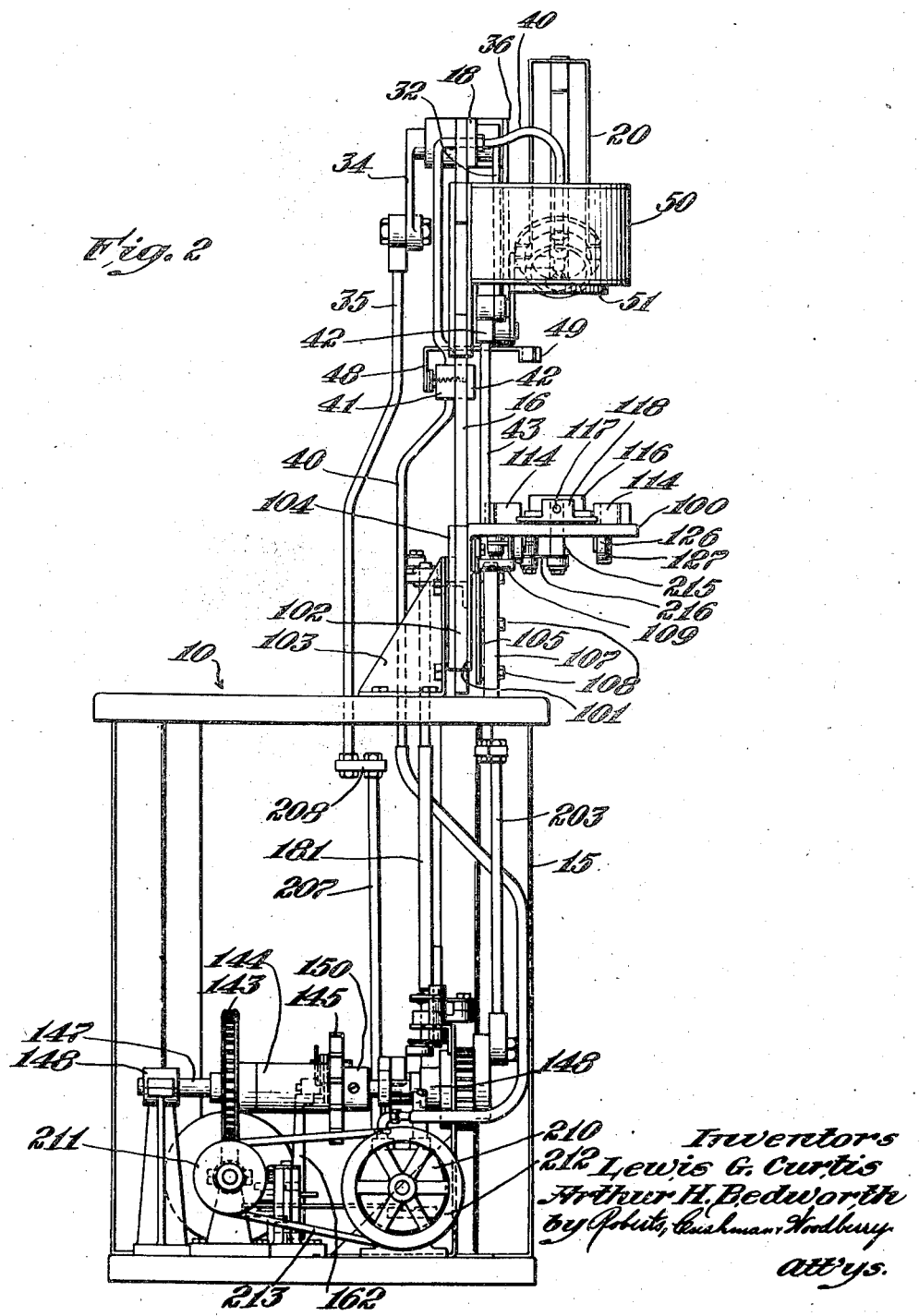
Fig. 2 is an end elevation thereof.

The two machines shown in the drawings differ primarily in that the machine of Figs. 1 to 8 inclusive is power driven whereas the other machine is operated by a foot treadle. The cap feeding and cap sealing units are identical but the actuators therefor vary as does the adjustment of the tables for different sizes of bottles. The common elements of both machines will be indicated on the drawings and in the following description by the same reference characters.

Each machine 10 comprises a base or standard 15 from one side of which extends a pair of uprights 16 and 17 connected at the top by a crossbar 18. The cap feeding unit is suspended from the crossbar 18. The bar 18 extends beyond the upright 17 and supports a chute 20 which carries the caps to be fed to the bottles. Fixed to the outer end of the bar 18 is a depending plate 21, to the lower portion of which is secured a bracket 22 by which the chute 20 is fixed in an inclined position, as shown in Figs. 1 and 9. The caps are nested and stacked in the chute with their flanges or skirts projecting rearwardly and upwardly. At the lower end of the chute is mounted an annular band 25 which receives the lowermost caps in the stack. The first or lowest cap rests against a plurality of spring mounted fingers 26 and against a pivotally mounted finger 27 at the top of the band. The finger 27 is pivoted at its rear end upon a bracket 28 carried by the band 25 and its forward end is held in cap-engaging position by a spring 29.

The feeding mechanism by which the caps are removed from the chute 20 includes a suction cup 30 carried at the apex of a substantially triangular plate 31. The plate 31 is pivoted adjacent one of its lower corners (the left in Figs. 1 and 9) upon the lower end of an arm 32 fixed at its upper end to one end of a rock shaft 33. Fixed to the other end of the shaft 33 is an arm 34 which is in turn connected by a rod or actuator 35 with the main operating mechanism. Secured at its upper end to the bar 18 is a plate 36 having an enclosed cam path 37 formed therein adjacent its lower end. Carried by the other corner of the plate 31 is a roller which enters the path 37 whereby the movement of the plate is controlled. Carried by the plate 31 in line with the cup 30 is an arm 38 which, as will be set forth below, serves as a wiper to seat the caps upon the mouths of the bottles.

Suction is set up in the cup 30 through a tube 40 which includes a valve block 41 mounted on a plate 42 fixed to the upright 17. Leading from the passage in the valve block to the rear face thereof is a tube 43 normally closed by a pad 44 carried by a flap 45. The flap 45 (see Fig. 8) is pivotally supported at one end upon the plate 42, and a spring 46 connecting the other end of the flap with a post 47 on the block yieldably urges the flap to close the tube 43. Mounted on the flap 45 is an arm 48 which extends upwardly and forwardly and carries at its outer end a trip bar 49 which projects into the path of the bottles and, as will appear from the description of the operation, acts when tripped by a bottle to break the suction in the tube 40.

The bottle sealing unit comprises a head 50 which rests upon a bracket 51 projecting forwardly from a block 52 enclosing and slidable upon the upright 16. A rod 53 pivotally attached to the bracket 51 and actuated by the operating mechanism, raises and lowers the head. The head 50 (see Fig. 7) has a casing which includes a top wall 55, side wall 56 and bottom wall 57, the latter being secured to the side wall by an angle beam 58 and having a central opening 59 therein. Mounted within the casing and suspended from the top wall 55 is an annular plate 60 from the center of which extends a post 61 which passes through the top wall 55 and receives a nut 62.

Resting upon the plate 60 is an annular disk 63 of rubber which surrounds the post 61. Secured to the periphery of the disk 63 is a downwardly extending skirt 64 which terminates in an annular bead 65. The bead 65 is continuous along its inner surface but is provided with a plurality of equally spaced notches in its outer surface. A cup-shaped plate 67 rests upon the disk 63 and is pressed closely in contact therewith by an expansion coil spring 68 surrounding the post 61. Projecting outwardly from the top of the plate 67 is a flange 70, the outer edge 71 of which is semi-circular in cross section. The side wall 56 is provided with a lining 72, the lower portion 73 of which is outwardly beveled. Between the plate 67 and the lining 72 are mounted a plurality of fingers 75. Each finger 75 includes at the top a crossbar 76 terminating at its inner end in a concave pocket 77 which receives the edge 71 of the flange 70, and at its outer end in a convex shoe 78 adjacent the lining 72. At the bottom of each finger 75 is formed a concave pocket 80 which receives the bead 65 and a pair of ears 71 between which is mounted a freely rotatable roller 82. The fingers 75 are so positioned that the pockets 80 thereof engage the bead 65 between the notches so that the rollers 82 of the fingers are yieldably held against the lining 72 of the head.

Figure 3:
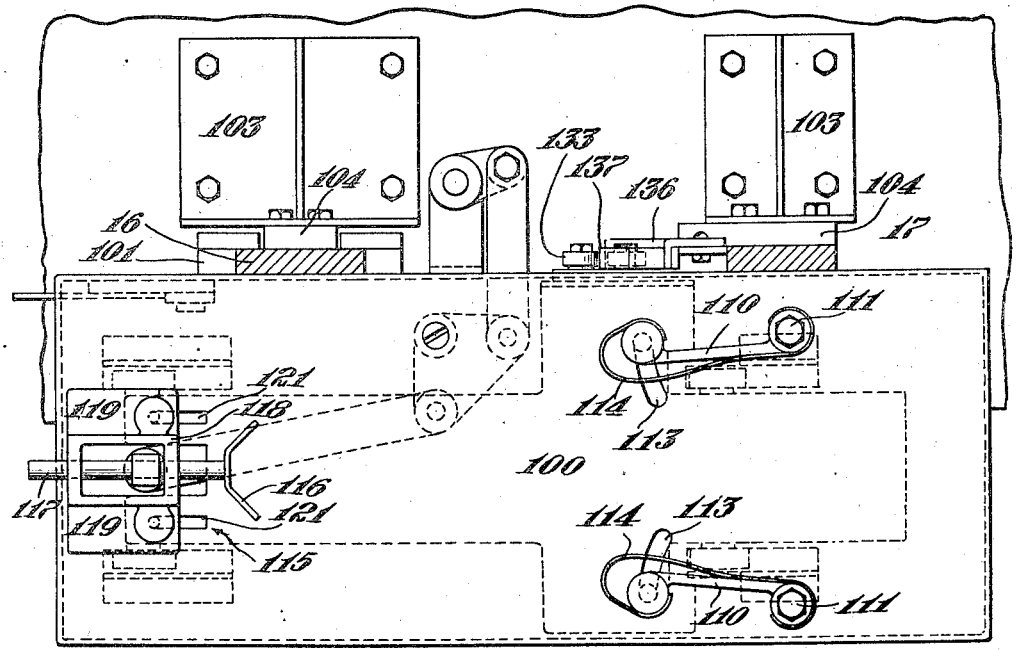
Fig. 3 is a top plan view, on an enlarged scale, of the table on which the bottles rest and over which they travel.
Figure 4:
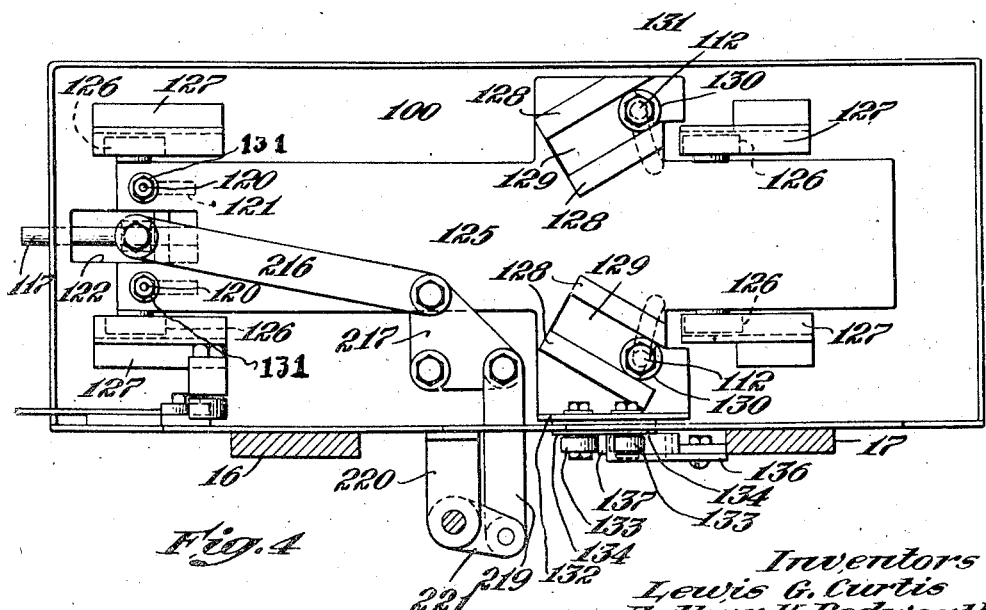
Fig. 4 is a bottom plan view of the table shown in Fig. 3.

Those features peculiar to the power-driven machine will now be described. The bottles to be capped are supported upon a table 100 which is vertically movable relative to the cap feeding and sealing units to permit handling of bottles of three sizes. The table 100 is guided in its vertical movement by the uprights 16 and 17 having a skirt 101 which is in slidable contact therewith by a split block 102 which engages the upright 16, as shown in Fig. 3. The uprights 16 and 17 are supported upon the base 15 by angle brackets 103 and blocks 104.

The height of the table 100 is determined by a vertical bar 105 pivoted at its upper end to the under side of the table and having a projecting nose 106 near the lower end. Resting upon the top of the base 15 and firmly secured thereto is a post 107 from the inner face of which project vertically spaced studs 108. The post 107 is so positioned that the nose 106 of the bar will engage one of the studs 108 and the studs are so spaced that when the nose 106 engages the lowest stud, as in Figs. 1 and 2, the table is adjusted for quart bottles and the engagement of the nose with the middle or upper stud adjusts the table for pint or half-pint bottles. Projecting outwardly from the bar 105 is a handle 109 by which the bar can be swung on its pivot to disengage the nose 106 from a stud. The weight of the bar 105 with its handle 109 is such that when the table is lifted, the nose 106 moves seriatim into engagement with the studs above it. When the table is to be lowered, however, it is slightly raised, the bar 105 is swung outwardly (to the left in Fig. 1) by the handle 109, the table is then lowered to approximately the correct height, and the handle is released, allowing the nose 106 of the bar to engage the proper stud.

The bottles are positioned at the cap feeding station and at the cap sealing station by adjustable guides carried by the upper face of the table 100. The guides at the feeding station comprise a pair of separated bars 110, each bar pivoted at one end upon studs 111 and having at the other end a downwardly projecting pin 112 which enters an arcuate slot 113 in the table. The ends of the bars are preferably rounded and receive the ends of spring plates 114 which project into the path of the bottles and yieldably position them. The guide at the sealing station is a barrier 115 comprising a U-shaped plate 116 supported on one end of a rod 117 and a box 118 which supports the rod 117. The box 118 includes side flanges 119 from which depend pins 120 which pass through slots 121 in the table. The box 118 is open at top and bottom and is mounted over a slot 122 in the table midway between the slots 121.

The guides are adjusted automatically when the table is raised or lowered. On the under side of the table is a reciprocable carriage 125 having rollers 126 near each end thereof which ride on shelves 127 secured to the under side of the table. On the under side of the carriage 125 are fixed pairs of bars 128 suitably spaced to reinforce the side walls of inclined converging slots 129 in the carriage. The pins 112 of the bars 110 carry rollers 130 which enter the slots 129. The pins 120 of the barrier 115 are secured to the carriage by nuts 131.

From the inner edge of the carriage 125 adjacent one of the ways 129 projects downwardly a plate 132, carrying rollers 133. The rollers 133 are spaced from the plate by collars 134 which extend through a slot 135 in the skirt 101 of the table. Mounted upon the block 104 adjacent the upright 17 is a cam plate 136 having a flange 137 of irregular conformation and farther from the upright 17 at the bottom of the plate than at the top of the plate. The rollers 133 are spaced apart and engage opposite walls of the flange 137.

When the table 100 is moved vertically to set the machine for bottles of the desired size, the flange 137 acts through the rollers 133 to reciprocate the carriage 125 accordingly. Since the rollers 130 are in the slots 129 of the carriage, the bars 110 will be shifted through the pins 112. At the same time the pins 120 of the barrier 115 will move the rod 117 and the plate 116 in unison with the carriage. Thus if the table 100, shown in Figs. 3 and 4 set for quart bottles, be raised, the bars 110 will be swung toward each other and the plate 116 advanced to the right, thus ensuring proper centering of bottles smaller than those of the quart size.

The machine is driven by a motor 140 through mechanism now to be described.

The motor 140 through a pinion 141 on the shaft 142 drives a gear 143 fixed at one end of a sleeve 144 which constitutes one element of a single-revolution clutch. At the other end of the sleeve 144 is mounted a disk 145 which is provided on its periphery with a plurality of equally spaced concave recesses 146. The sleeve 144 is freely rotatable about a shaft 147 mounted in bearings 148 and is positioned thereon by a collar 149.

Figure 6:
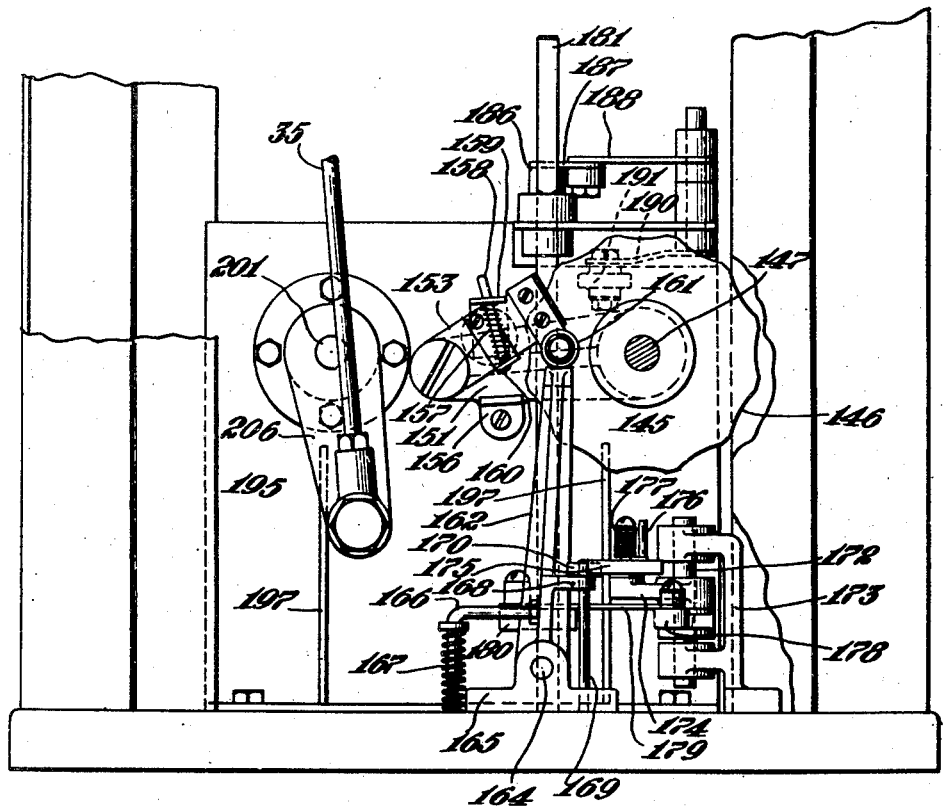
Fig. 6 is a rear view of such main operating mechanism, with certain of the elements omitted.
Figure 10:
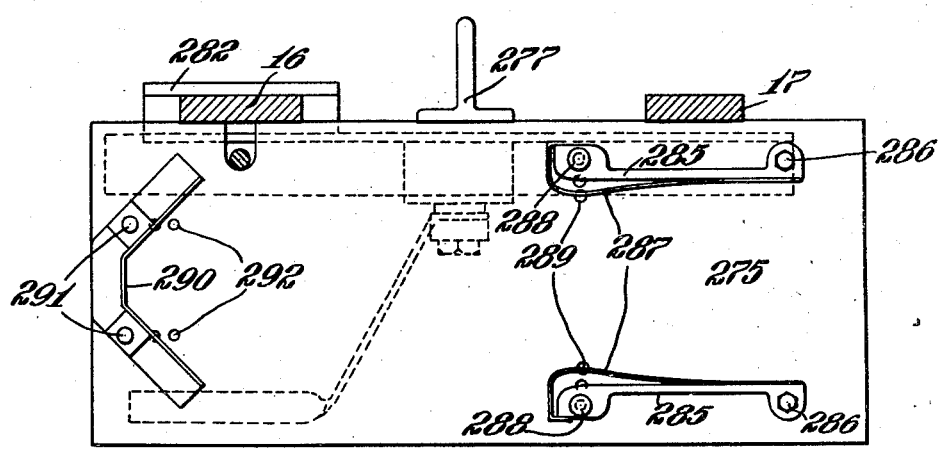
Fig. 10 is a top plan view of the table of the machine shown in Fig. 9.
Figure 11:
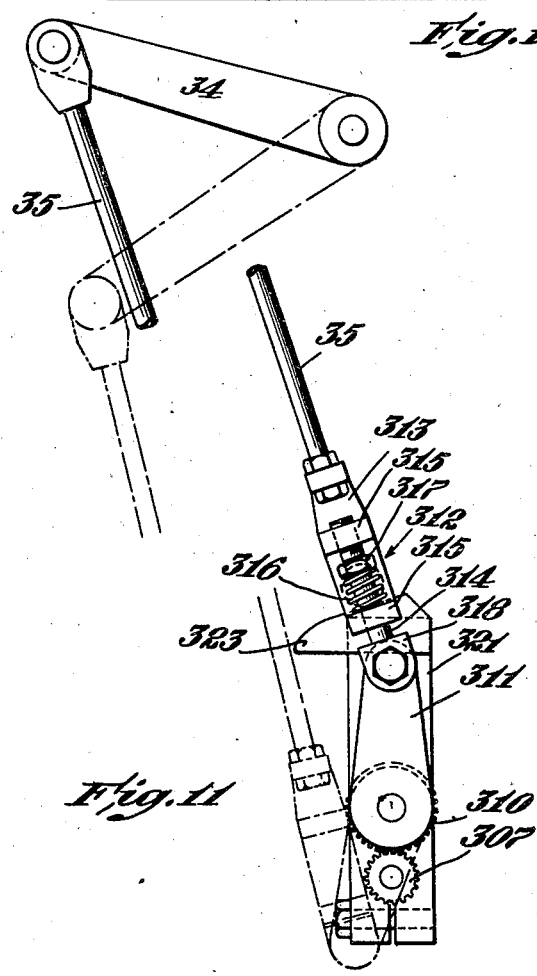
Figs. 11 and 12 are detail views of the actuator for the cap feeding unit.
Figure 12:
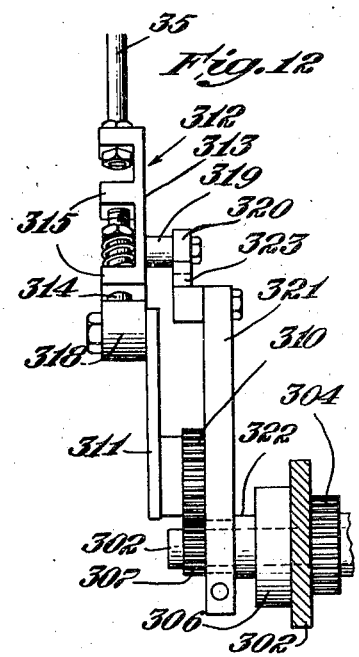

The other element of the clutch is a sleeve 150 which is keyed to the shaft 147 and from which extends an arm 151. Pivoted on a stud 152 at the outer end of the arm 151 is a plate 153 which is in a plane parallel to the arm 151 and spaced therefrom by a collar 154. As shown in the drawings the arm 151 and plate 153 are in planes on opposite sides of the plane of the disk 145. Carried by the plate 153 is a roller 155 adapted to contact with the periphery of the disk 145 when the plate 153 rests upon a bracket 156 carried by the arm 151 against which bracket it is yieldably held by a spring 157 surrounding a pin 158 and bearing at its ends against brackets 159 and 160. Secured to the plate 153 is a roller 161 which projects at right angles from the free end of the plate. Pivotally mounted at its base is a post 162 which, in the position shown in Fig. 6, is below and in the path of the roller 161 and in such position prevents the rotation of the clutch as will be described below.

The post 162 is attached to sleeve 163 rotatably carried by a stud shaft 164 supported by a bracket 165. Projecting from the sleeve 163 is a right angle pin 166, the free end of which enters a spring 167 which tends to hold the post in the position shown in Fig. 6. Projecting from the sleeve 163 in the opposite direction from the pin 166 is an arm 168 which carries a pin 169 that limits the movement imparted to the sleeve by the spring 167. Freely rotatable on the pin 169 above the arm 168 is a roller 170 in the path of travel of an arm 171.

Figure 5:
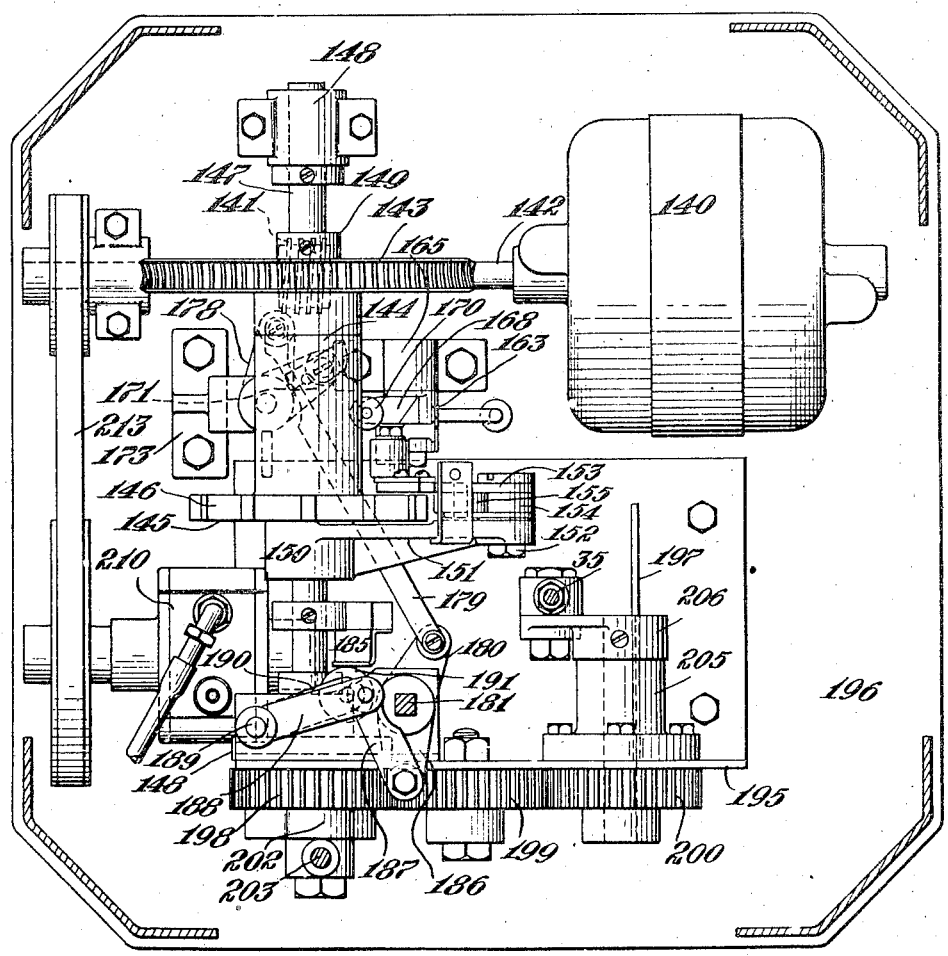
Fig. 5 is a top plan view of the main operating mechanism.

The arm 171, which is fixed to a stud shaft 172 supported by a two-armed bracket 173, is made up of two parts, one part 174 being fixed to the shaft 172 and the other part 175 being pivoted on the free end of the part 174 and normally held by a pin 176 and spring 177 in the position shown in dotted lines in Fig. 5. Also fixed to the shaft 172 is an arm 178 to which is secured one end of a link 179. The other end of the link 179 is secured to an arm 180 fixed to a rock shaft 181. Thus the rotatory movement of the shaft 181 swings the arm 171 and causes it to trip the roller 170 of the sleeve 163 and swing the post 162 to the left (Fig. 6) away from the position below the roller 161. When the roller 161 is released, the plate 153 is swung clockwise (Fig. 6), bringing the roller 155 into engagement with the rotating disk 145 and initiating rotation of the shaft 147. Obviously as soon as the arm 171 has passed the roller 170 and the roller 161 has left the post 162, the spring 167 acts to return the post to its normal position (Fig. 6), in which it stops the travel of the roller 161 at the completion of one revolution so that the shaft 147, arm 151, plate 153 and associated elements are again at rest.

The arm 171 is restored to its normal position (Fig. 5) by means of a trip 185 carried by the shaft 147. Fixed to the rock shaft 181 is a second arm 186 connected by a link 187 with an arm 188 fixed to a stud shaft 189. Also fixed to the stud shaft 189 is an arm 190 which carries a roller 191 normally out of the path of travel of the trip 185. When the shaft 181 is turned to throw the clutch as described above, the roller 191 is advanced into the path of the trip 185 and is engaged thereby so that the parts actuated by the shaft 181 are returned to their normal position. Since the arm is articulated, the part 175 will yield upon contact with the roller 170 and pass the latter without moving it out of its normal position.

One end of the shaft 147 extends through a right angular plate 195 which is secured to the lower wall 196 of the base 15, and reinforced by inclined braces 197. Fixed on the projecting end of the shaft 147 is a gear 198 which, through an idler gear 199, drives the gear 200 on one end of a stud shaft 201. A collar 202 fixed to the shaft 147 beyond the gear 198 is connected by a rod 203 and crossplate 204 with the rod 53 by which the cap sealing unit is actuated. On the other end of the stud shaft 201, which is supported by a bearing 205 mounted on the plate 195, is a collar 206 to which is pivotally connected by a rod 207 and cross-plate 208 the lower end of the rod 35 by which the cap feeding unit is actuated.

Suction is set up in the tube 40 leading to the cup 30 by means of a pump 210 driven continuously by the motor 140 through pulleys 211 and 212 and a belt 213.

The rotative movement of the shaft 181 by which the clutch is thrown is, in this embodiment, imparted to the shaft by pressure upon the barrier plate 116 at the cap sealing station. Fixed to the rod 117 is a stud 215 which extends down through the slot 122 in the carriage. Pivoted to the bottom of the stud 215 is one end of a link 216, the other end of which is pivoted to the under side of one corner of a triangular plate 217. The plate 217 is pivoted at the upper side of another corner to a stud 218 carried by the table 100. Pivoted to the under side of the third corner of the plate 217 is one end of a link 219. The shaft 181 is supported at its upper end in a bracket 220 mounted on the table 100 and carries an arm 221 to which the other end of the link 219 is pivotally secured.

The operation of the power-driven machine will now be described, it being assumed that the parts are as shown in Fig. 1 with the motor 140 in operation, suction set up in the line 40, and the chute 20 containing a supply of caps The barrier plate 116 is first manually tripped whereupon, through the mechanism already described, the shaft 147 is given one complete rotation. The cap feeding unit is set in operation by the actuator 35, causing the cup 30 to rock and follow the cam slot 37 until it bears against the lowermost cap in the stack As the cup approaches the stack, the plate 31 raises the finger 27 so that when the cup 30 is moved away from the stack it easily carries with it the lowermost cap which is held to the cup by suction. When this first revolution is completed the parts have resumed the positions shown in Fig. 1 with a cap held by the cup 30. The cap sealing head has in the meantime reciprocated idly.

A bottle of the proper size is now moved along the table 100 from the right. As the bottle reaches the cap feeding station it trips the bar 49 whereby suction in the line 40 is broken so that the cap in the cup 30 drops upon the mouth of the bottle just below it. As the bottle advances, the wiper 38 seats the cap in place on the bottle. When the bottle trips the barrier plate 116 and initiates a revolution of the shaft 147, the head 50 descends and crimps the cap upon the bottle. While the bottle is at first moved beyond the sealing position to actuate the rod 117 and the parts associated therewith, it is, prior to its engagement by the head 50, moved back into the correct position due to the reverse rotation of the shaft 181 by the trip 185. While the cap sealing operation is taking place, the cap feeding unit is also in operation and a fresh cap is withdrawn from the stack by the cup. The machine is now ready to cap another bottle.

From the above description it will be apparent that the bottles being capped determine the operation of both units, the cap is released from the cup 30 when the bar 49 is tripped by the bottle, and the tripping of the barrier plate 116 causes the head 50 to seal the cap on the bottle by which the plate was tripped and causes the cup 30 to select a cap to be presented to the succeeding bottle.

In the machine operated by a foot treadle the bottles to be capped are supported upon a table 275 which, like the table 100 of the power-driven machine, is adjustable in height and is provided with guides so that it can be set to cap bottles of various sizes, e. g., quart bottles, pint bottles and half-pint bottles. The table 275 is carried by the base 15 on the top of which rests a block 276 secured in position by a vertical beam 277 and having a pin 278 projecting forwardly therefrom. Swung from a block 279 fixed to the under side of the table 275 is a bar 280 having several notches 281 (three being here shown) which are adapted to engage selectively the pin 278 so that the table is firmly supported. A box 282 surrounding and slidable along the upright 16 and secured to the side of the table 275 steadies the table. An arm 283 fixed to the bar 280 and extending forwardly to a point near the front edge of the table (see Fig. 9) is provided to swing the bar 280, the top of the base being cut away to permit such movement. By providing three notches 281 the table 275 can be set at three different heights to allow three sizes of bottles to be capped, usually quart, pint and half-pint.

In order to position the bottles properly at the stations, guides are mounted on the table. At the cap feeding station the guide consists of two bars 285 each pivoted at the right end to the table by a stud 286. Straps 287 of spring metal, rigidly secured to the pivoted ends of the bars and bent loosely around the other ends, engage the bottle yieldably. The bars are removably set at the other ends by pins 288 which enter holes 289 in the table. The holes 289 associated with each bar 285 are three in number. To position the bottles at the cap sealing station, a barrier 290 substantially in the form of a widened U is provided. This barrier is selectively positioned on the table by pins 291 which engage holes 292, also in sets of three in number.

The cap feeding and cap sealing mechanisms preferably operate simultaneously and in the machine illustrated in Figs. 9 to 12 inclusive this is attained by the employment of a foot actuable treadle 300. The treadle 300 is fixed to a block 301 which encloses and is slidable over the upright 17. Suitable means (not shown) are provided to hold the block 301 in the position shown in Fig. 9, with its upper edge resting against the lower edge of a crossbeam 302 suitably secured to the uprights 16 and 17 and the vertical beam 277. Carried by the block 301 and extending vertically in front of the upright 17 is a rack bar 303 which is at all times in mesh with a pinion 304 mounted upon a freely rotatable shaft 305 supported in a stationary journal 306 mounted on the beam 302. The pinion 304 is mounted on the shaft 305 in front of the beam 302 and a gear 307 is mounted on that shaft behind that beam. The rocking of the shaft 305 controls the operation of both cap feeding and cap sealing mechanisms.

The actuation of the feeding mechanism will first be described. In mesh with the gear 307 is a gear 310 mounted upon and rigidly secured to the lower end of an arm 311. The upper end of the arm 311 is pivotally secured to a link 312 fixed to the lower end of the operating rod 35 previously mentioned. The link 312 comprises a bar 313 fixed to the rod 35 and a rod 314 attached to the arm 311 and reciprocable relative to the bar 313, being guided by holes in bosses 315 on the bar 313. A spring 316 encircling the rod 314 between the bosses coacts with a nut 317 on the rod to hold the boss 318 at the end of the rod to which boss the arm 311 is secured, yieldably in contact with the bar, as shown in dotted lines in Fig. 11. Freely rotatable on a stud 319 projecting from the bar 313 is a roller 320. A post 321 clamped upon a shoulder 322 projecting from the journal 306 supports a stationary cam 323.

The depression of the treadle 300 and consequent rocking of the shaft (in a clockwise direction in Fig. 9) actuates the arm 311 through the gears 307 and 310 in the opposite direction. As the arm travels, the rod 35 is raised and the arm 32 swung also toward the chute 20. Since the plate 31 is pivoted on the arm 32 with its roller in the cam path 37, the plate is first rocked on the arm until the roller has traveled upwardly in the path 37 a predetermined distance and is then advanced until the cup 30 is brought into contact with the lowermost cap in the chute. Just prior to this time the roller 320 on the bar 313 of the link 312 has ridden onto the cam 323 and this cam is of such contour that the final travel of the arm 311 has no effect upon the arm 32. The dwell thus produced continues after the arm 111 starts its return travel when the treadle is released, and during that dwell suction is set up in the cup 30 by which the lowermost cap is firmly gripped and removed from the stack in the chute. The cup 30 carrying the cap now resumes the position shown in Fig. 9, the cap being so inclined that when the mouth of the bottle to be capped is advanced between the guides 285 into contact therewith and the suction is broken, the cap will drop onto the bottle. As the bottle thus capped is advanced along the table to the cap sealing station, the wiper 38 seats the cap firmly in position.

The sealing of the cap on the bottle is, as previously pointed out, controlled by the travel of the treadle 300. The pinion 304, in mesh with the rack 303, also meshes with a gear 325 freely rotatable on a shaft 326 carried by the crossbeam 302. The rod 53 by which the cap sealing head 50 is reciprocated is pivotally connected at its lower end to the gear 325 and actuated thereby. Hence when a bottle with a cap placed on its mouth has been properly positioned on the table 275 by the guide 290, the head 50 will seal the cap on the bottle, as pointed out hereinabove.

In connection with the feeding of the caps it has been found of advantage to employ suction to hold the caps to the cup 30. Various means for setting up suction may be used. The machine shown in Figs. 9 to 12 being, as previously pointed out, designed for use in small dairies where electric power is not available, must consequently be equipped with suction creating means which operate without such power. Mounted in the base 15 of the machine is a pump having the general characteristics of a hand pump. Such pump comprises a cylinder 330 having a plunger 331 provided with a piston within the cylinder (not shown), an inlet connected to the tube 40 and an outlet (not shown). The inlet and outlet are valved in the usual manner so that when the plunger descends air is forced from the cylinder through the outlet, and when the plunger rises air is drawn through the tube 40. The plunger 331 of the pump is connected by a rod 332 with the block 301 so that it is actuated in unison with the operation of the feeding mechanism and suction is set up in the line and cup when the plunger 331 starts to rise, the cup 30 being, as previously stated, held at that time in contact with the lowermost cap in the chute 20.

The operation of this machine is substantially the same as that of the power-driven machine except for the way in which it is actuated. Assuming that the parts are in the position shown in Fig. 9, the treadle 300 is first depressed to cause the cup 30 to approach the chute 20, withdraw a cap therefrom and resume the Fig. 9 position. The head 50 will obviously move down and back in the meantime. A bottle to be capped is now moved by hand along the table 275, and as it travels between the guides at the first station it receives the cap, at the same time engaging the trip bar 49 to break the suction and release the cap from the cup. The cap is then seated by the wiper 38 on the mouth of the bottle, which continues its travel to the barrier 290. When the bottle is positioned at the cap sealing station by the barrier 290 the treadle 300 is depressed, causing the head 50 to seal the cap on the bottle and at the same time actuating the cap feeding unit, as described above.

While two embodiments of this invention have been shown and described, it will be understood that the invention is not limited to the employment of the specifically described features and that many changes in structure may be made without departing from the spirit and scope of the invention as set forth in the following claims.

We claim:

1. In a bottle capping machine, the combination with a table for supporting a series of bottles to be capped, of a cap feeding unit including a chute in which a stack of caps is placed, means including a suction cup movable toward and from the chute and by which a cap is removed from the stack in the chute and temporarily held at a predetermined position directly in the path of travel of the bottles, and mechanism including a trip and wiper successively operated by the bottle as it passes the cap feeding unit for breaking suction in said cup and causing the cap presented by the cup to be seated on the mouth of the bottle.

2. In a bottle capping machine, the combination with a table for supporting a series of bottles to be capped, of a cap feeding unit including a chute in which a stack of caps is placed, a suction cup movable toward and from the chute and by which a cap is removed from the stack in the chute and temporarily held at a predetermined position directly in the path of travel of the bottles, a suction line leading to the cup and by which the cap is held to the cup, and a valve in said line including a bar which is tripped by a bottle as it passes the cap feeding unit to break the suction and permit the cap presented by the cup to be seated on the mouth of the bottle.

3. In a bottle capping machine, the combination with a table for supporting a series of bottles to be capped, of a cap feeding unit including a chute in which a stack of caps is placed, a cup movable toward and from the chute and by which a cap is removed from the stack in the chute and presented in the path of travel of the bottles, a suction line leading to the cup and by which the cap is held to the cup, and a valve in said line including a bar which is tripped by a bottle as it passes the cap feeding unit to break the suction and permit the cap presented by the cup to be seated on the mouth of the bottle, and a wiper carried by the cup which presses the cap onto the mouth of the bottle on which it is seated as the bottle continues to advance over the table.

4. In a bottle capping machine, a cap sealing unit comprising a chute in which a stack of caps is placed, a cup movable toward and from the chute and by which the lowest cap is removed from the stack in the chute, and means for actuating said cup including a rod, means for reciprocating said rod, a roller carried by the rod, and a stationary cam over which the roller travels during the reciprocation of the rod and which is so formed that the cup is held at rest in register with the cap just prior and subsequent to the completion of the reciprocation of the rod.

5. In a bottle capping machine, a cap sealing unit comprising a chute in which a stack of caps is placed, a cup movable toward and from the chute and by which the lowest cap is removed from the stack in the chute, and means for actuating said cup including a rod, means for reciprocating said rod, a roller carried by the rod, and a stationary cam over which the roller travels during the reciprocation of the rod and which is so formed that the cup is held at rest in register with the cap just prior and subsequent to the completion of the reciprocation of the rod, and a pump by which suction is set up in the cup to hold the cap thereto, such pump being operated by the rod reciprocating means to set up suction while the cup is so held at rest.

6. In a bottle capping machine of the type having a fixed capping mechanism and a table on which a series of bottles to be capped are supported: the combination comprising adjustable guide means projecting from said table for positioning bottles to be operated on by said capping mechanism, adjustable means for supporting said table at different heights relative to said capping mechanism so as to accommodate bottles of different sizes, and connections between said guide means and table-supporting means constructed and arranged so that movement of the table in one direction or the other automatically adjusts said guide means.

7. In a bottle capping machine of the type having fixed cap feeding and cap sealing units spaced from each other, and a table on which the bottles to be capped are supported: the combination comprising movable guides for positioning the bottles at both units so as to accommodate bottles of different sizes, means for supporting said table at different heights relative to said units so as to accommodate such different size bottles, mechanism for moving said guides so as to effect a predetermined adjustment thereof, and connections between said mechanism and said table-supporting means constructed and arranged so that as said table is moved vertically toward and away from said units said guides are adjusted to position bottles in accordance with the adjustment of the table.

8. In a bottle capping machine of the type having spaced cap feeding and cap sealing units, and a table on which a series of bottles to be capped are supported: the combination comprising adjustable guides for the bottles at both units so as to correctly position bottles of different sizes, means for supporting said table at different heights relative to said units so as to accommodate such different size bottles, and connections between said guides and table-supporting means constructed and arranged so that movement of the table in one direction or another automatically adjusts said guides, said connections including a carriage mounted for reciprocation of the under side of the table and in contact with said guides, a stationary flange of irregular contour, and rollers mounted on said carriage in contact with said flange and operative as the table is moved toward and away from the units to reciprocate the carriage so as to adjust said guides.

9. In a bottle capping machine of the type having a cap feeding unit, a cap sealing unit and a table on which the bottles to be capped are supported: the combination comprising guides for positioning the bottles at both units, said guides being adjustable for bottles of different sizes, and said table being movable toward and from said units to accommodate such different size bottles, the guide for the bottles at the cap feeding unit comprising bars each pivoted at one end, pins at the other ends of the bars, which pins extend through arcuate slots in the table, and rollers on the pins below the table, a carriage mounted for reciprocation on the under side of the table and having inclined slots which receive said rollers, the guide for the bottles at the cap sealing unit being a barrier comprising a U-shaped plate, a rod on which said plate is mounted, a box supporting said rod, and pins extending through slots in the table by which said box is attached to said carriage, and means for reciprocating said carriage as the table is moved vertically whereby the guides are adjusted automatically.

10. In a bottle capping machine of the type having a cap feeding unit, a cap sealing unit and a table on which the bottles to be capped are supported: the combination with guides for positioning the bottles at both units, said guides being adjustable for bottles of different sizes, and said table being movable toward and from said units to accommodate such different size bottles, the guide for the bottles at the cap feeding unit comprising bars each pivoted at one end, pins at the other ends of the bars, which pins extend through arcuate slots in the table, and rollers on the pins below the table, a carriage mounted for reciprocation on the under side of the table and having inclined slots which receive said rollers, the guide for the bottles at the cap sealing unit being a barrier comprising a U-shaped plate, a rod on which said plate is mounted, a box supporting said rod, and pins extending through slots in the table by which said box is attached to said carriage, and means for reciprocating said carriage as the table is moved vertically whereby the guides are adjusted automatically, said carriage reciprocating means comprising a stationary inclined flange of irregular contour, and a pair of rollers mounted on the carriage in contact with said flange.

11. A semi-automatic bottle capping machine comprising stationary means for supporting a series of bottles to be capped, a chute for receiving a stack of caps to be applied to said bottles, feeding mechanism including a swing arm having at its free end a cap holding means operative to remove a cap from said stack and releasably hold it in a predetermined position above the supporting means, a trip associated with said cap holding means for effecting the release of a cap held thereby, guide means operative to guide a bottle when moved along said supporting means so as to operate said trip and receive a cap upon the release of said cap holding means, a cap sealing head mounted to reciprocate toward and away from said supporting means and operative to seal a cap about the mouth of a bottle, actuating means for effecting a simultaneous operation of said feeding mechanism and sealing head, a depressible member spaced above said supporting means and operative when depressed by a bottle moved against it correctly to position the bottle to be operated on by said sealing head, and connections between said depressible member and actuating means for effecting the operation of said actuating means in response to depression of said member.

ARTHUR H. BEDWORTH.
LEWIS G. CURTIS.